United States Patent [19]

Leclercq

[11] Patent Number: 4,761,949
[45] Date of Patent: Aug. 9, 1988

[54] THRUST REVERSER POSITION INDICATOR SHAFT BEARING ASSEMBLY

[75] Inventor: Guy E. O. Leclercq, Melun, France

[73] Assignee: Societe Nationale d'Etude et de Construction de Moteurs d'Aviation (SNECMA), Paris, France

[21] Appl. No.: 104,218

[22] Filed: Oct. 5, 1987

[30] Foreign Application Priority Data

Oct. 8, 1986 [FR] France ............... 86 13991

[51] Int. Cl.⁴ ............................... F02K 3/04
[52] U.S. Cl. ...................... 60/226.2; 384/192; 384/202; 384/215; 384/223; 384/428; 384/444
[58] Field of Search .............. 60/226.2, 230, 229; 239/265.31; 384/192, 215, 428, 444, 223, 202; 116/230, 285; 340/686; 73/865.9

[56] References Cited

U.S. PATENT DOCUMENTS

| | | | |
|---|---|---|---|
| 2,353,763 | 7/1944 | Rodman | 384/223 |
| 2,674,330 | 4/1954 | Feil, Jr. | 384/215 |
| 3,500,644 | 3/1970 | Hom et al. | 60/229 |
| 3,567,262 | 3/1971 | Szkaradek et al. | 384/202 |
| 3,604,765 | 9/1971 | Babcock | 384/192 |
| 3,746,409 | 7/1973 | Heiland | 384/215 |
| 4,005,822 | 2/1977 | Timms | 239/265.31 |
| 4,177,639 | 12/1979 | Taylor | 60/226.2 |
| 4,232,516 | 11/1980 | Lewis et al. | 60/226.2 |

FOREIGN PATENT DOCUMENTS 109219 5/1984 European Pat. Off. .
948382 2/1964 United Kingdom ............. 384/215

Primary Examiner—Donald E. Stout
Attorney, Agent, or Firm—Bacon & Thomas

[57] ABSTRACT

A bearing assembly is disclosed for supporting the downstream end of a shaft for a position indicating system for a turbofan thrust reverser. The bearing assembly has a pair of support arms supporting a bushing which is attached to the downstream end of the shaft. The arms are oriented in a plane substantially transverse to the longitudinal axis of the shaft and are clamped to a mounting bracket by spring biased mounting plates. Belleville springs are utilized to provide the biasing force and may be adjusted to compensate for wear of the system.

13 Claims, 3 Drawing Sheets

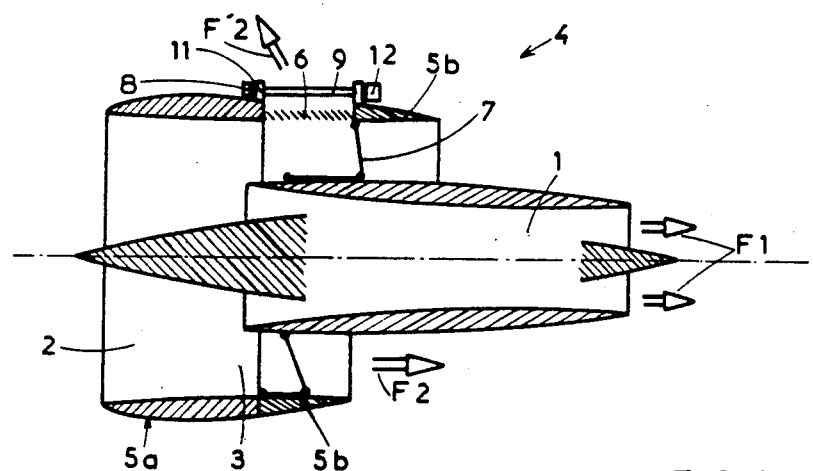
FIG:1 (PRIOR ART)
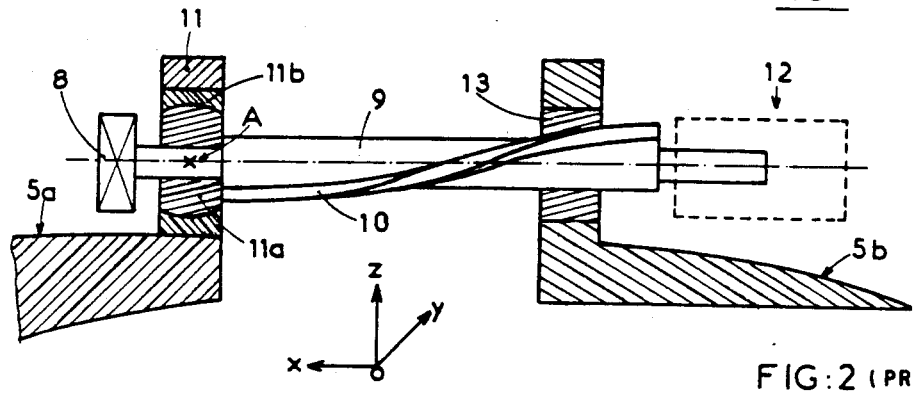
FIG:2 (PRIOR ART)
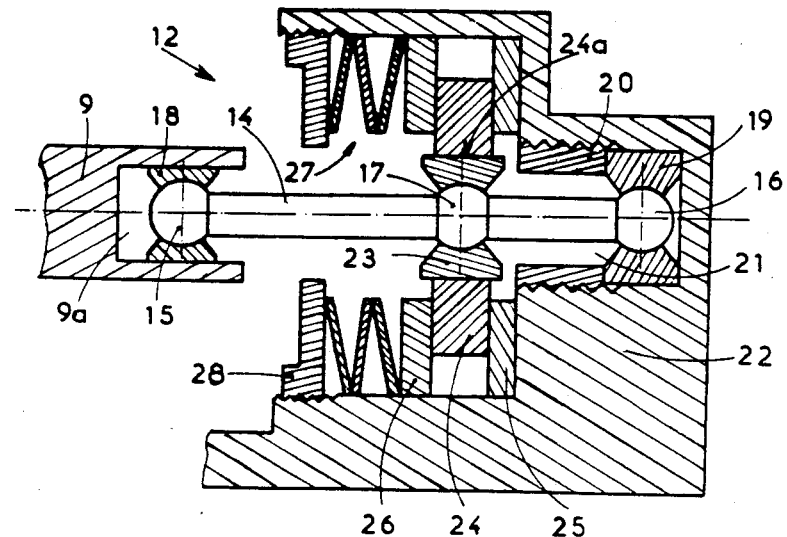
FIG:3 (PRIOR ART)

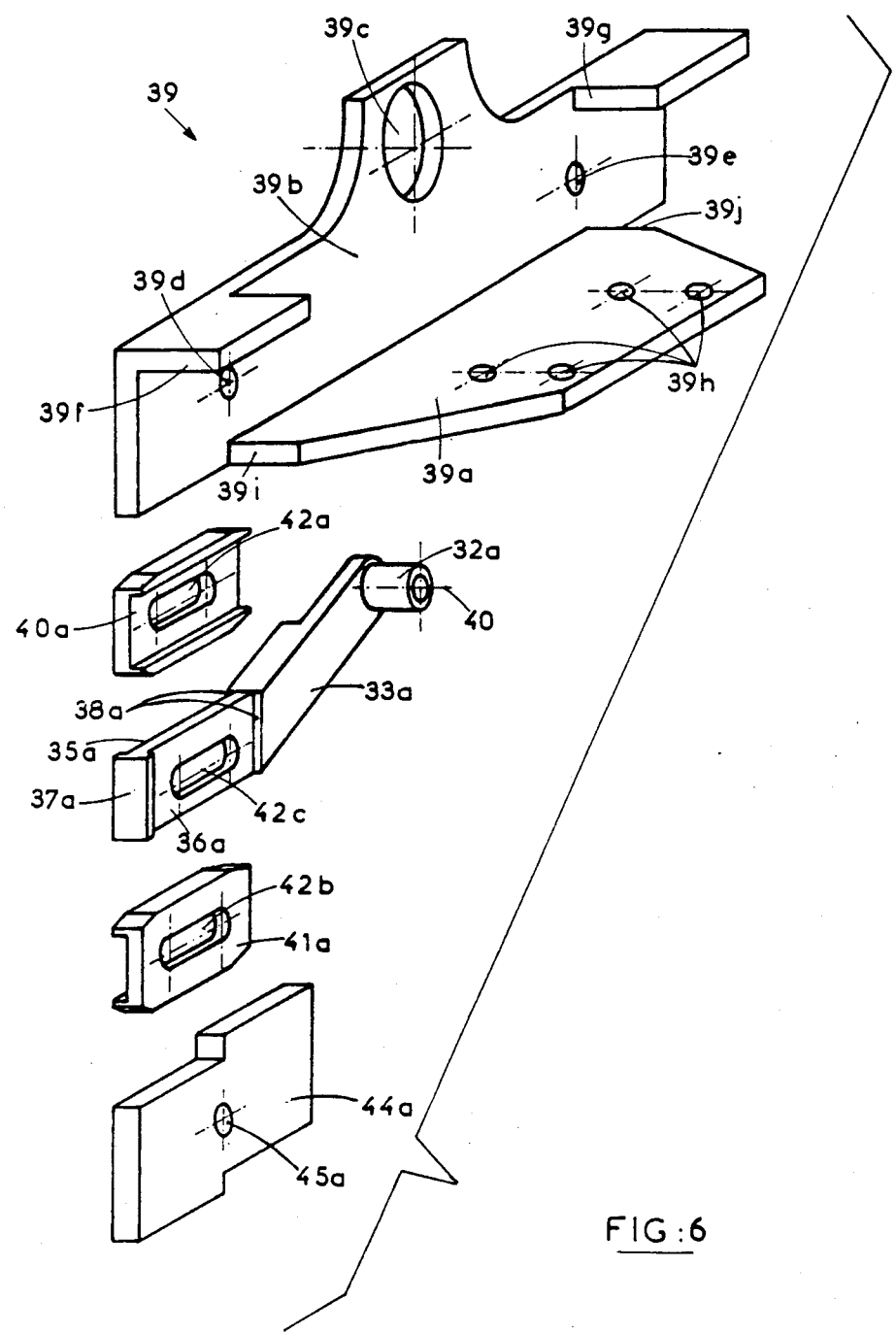
FIG:6

THRUST REVERSER POSITION INDICATOR SHAFT BEARING ASSEMBLY

BACKGROUND OF THE INVENTION

The present invention relates to a bearing assembly for supporting one end of a shaft for a position sensor in a thrust reverser for a turbofan jet engine.

FIG. 1 schematically illustrates a turbofan aircraft engine of known construction. A centrally located turbojet engine 1 delivers thrust by means of a primary jet flow indicated at F1. The turbojet engine 1 drives a fan 2 located at the front of the turbojet engine air intake such that a portion of the air flow generated by fan 2 exits through an annular secondary duct 3 as secondary flow F2 which produces additonal thrust. The secondary duct 3 is equipped with a thrust reverser 4 which is shown in its retracted position in the lower half of FIG. 1 and in its extended position in the upper half of FIG. 1. In its retracted position, it permits air to flow through the annular duct 3 as secondary flow F2. In its extended position, shutters 7 serve to redirect the secondary flow through baffles 6 in the direction of flow F'2. the housing of the secondary duct 3 comprises a fixed front portion 5a and a movable rear sleeve portion 5b which may translate axially by known control means. In the retracted position of the thrust reverser, sleeve 5b covers the baffles 6 and the shutters 7 conform to the inner wall of this sleeve so as not to impede the air flow therethrough.

In order to maintain safe flight conditions and to synchronize the various controls for the engine, the position of the thrust reverser must be reliably indicated. Typically, such indication means comprises a position sensor 8, shown in FIG. 2, which transmits the displacements and the position of movable sleeve 5b. In a known system, the position sensor 8 is located at one end of a shaft 9 which extends generally parallel to the axis of movement of sleeve 5b and is of sufficient length to accommodate the full range of movement of this sleeve. The sleeve 5b may traverse a distance of approximately 600 mm in some applications.

Shaft 9 is substantially cylindrical and has a helical cam 10 formed on its outer surface, the contour of the cam being a function of the servo control output of position sensor 8. The shaft 9 is rotatably supported on an upstream bearing 11 and a downstream bearing 12, both of which are fixedly attached to the fixed portion 5a of the secondary duct casing. A bushing 13 is attached to movable sleeve 5b and slides along the length of shaft 9. Bushing 13 has a slot therein to engage helical cam 10 such that, as bushing 13 and movable sleeve 5b translate axially, shaft 9 is rotated such that through its connection with position sensor 8, the position sensor produces an output signal indicative of the position of the movable sleeve 5b.

The upstream bearing 11 typically comprises a spherical joint 11a which is fixedly attached to shaft 9 and a spherical outer race 11b which is fixed to the upstream portion 5a of the secondary duct casing. The interengaging spherical surfaces of 11a and 11b allow the shaft 9 to rotate and will accommodate slight movement in directions transverse to the rotational axis. The center A of the spherical joint 11a is a stationary point of the shaft 9.

A known downstream bearing 12, only schematically illustrated in FIG. 2, is shown in more detail in FIG. 3. It is necessary to support the downstream end of shaft 9 in order to avoid any possibility of the rupture of this shaft due to the large overhang when the sleeve 5b is in its retracted position. The duct casing, fixed portion 5a and movable sleeve 5b, are subjected to high mechanical stresses during the engine operation, which may encompass cyclical deformation, which would substantially reduce the useful life of shaft 9 in the absence of a downstream bearing support. As a result of these stresses, shaft 9 undergoes both expansion and displacements in the x direction as well as orthogonal y and z directions.

In the prior downstream bearing support assembly illustrated in FIG. 3, the shaft 9 defines a recess 9a in its downstream end which cooperates with a shaft 14 via spherical joint 15 engaging a corresponding seat 18. A similar spherical joint comprising spherical ball 16 and spherical seat 19 attaches the opposite end of shaft 14 to a case 22. A third ball joint 17 engages spherical seat 23 between the ends of shaft 14. Nut 20 serves to retain the spherical seat 19 within bore 21 formed in case 22. Case 22 is fixed to stationary portion 5a by known means not shown. Spherical seat 23 is supported in plate 24 between shoes 25 and 26 which are slidably retained in an opening defined in case 22 by Belleville springs 27 and nut 28. Spherical seat 23 may slide axially within the bore 24a defined in plate 24 and the plate 24 can slide transversely between the shoes 25 and 26. The force compressing the assembly against the end of the bore in case 22 by the Belleville springs 27 may be adjusted by tightening or loosening nut 28. The assembly permits the downstream end of the sensor bar to move, while at the same time enabling the dampening of such movement to be adjusted.

This known design, however, has not fully obviated the problems associated with supporting the downstream end of shaft 9. Depending upon the displacements caused by the expansion and mechanical deformation of the shaft 9, the shaft 14 undergoes significant angular movement. Furthermore, the space to seat the damping elements, the plate 24, the shoes 25 and 26, and the springs 27 often renders the damping inadequate. This results in premature wear and quick maladjustment of the device causing a serious lack of reliability in the thrust reverser positioning system.

SUMMARY OF THE INVENTION

It is a primary object of the invention to provide a bearing assembly for supporting the downstream end of the position indicating shaft without entailing the drawbacks of the known apparatus. The bearing assembly according to the invention comprises a bushing engageable with the downstream end of the shaft which is supported at first ends of a pair of support arms. The second ends of the support arms are attached to a mounting bracket such that they may undergo movement with respect to the mounting bracket in a plane which extends generally perpendicular to the longitudinal axis of the position indicating shaft.

Cylindrical flanges extend from the first ends of the support arms in opposite direction, one of the cylindrical flanges extending through an enlarged opening in the mounting bracket. Contact between the cylindrical flange and the inner surface of the enlarged opening serves to limit the play in a transverse direction of the end of the shaft.

Each of the second ends of the support arms are located between a portion of the mounting bracket and a mounting plate. Mounting bolts extend through holes defined by the mounting bracket and the mounting plates, as well as through an elongated slot defined in the second ends of the support arms. Belleville springs are interposed between the bolts and the mounting bracket, and the bolts and the mounting plates. Anti-friction shims may be interposed on either side of the second ends of the support arms between the mounting bracket and the mounting plates, respectively.

The mounting plates are attached to the mounting bracket such that they may undergo only translational movement in a direction substantially parallel to the longitudinal axis of the shaft, but may not undergo any rotational movement or translational movement transverse to the longitudinal axis of the shaft.

BRIEF DESCRIPTION OF THE FIGURES

FIG. 1 is a schematic cross sectional view of a turbofan engine of known construction.

FIG. 2 is a partial longitudinal cross sectional view illustrating a position indicating shaft of a known thrust reverser system.

FIG. 3 is a partial, cross sectional view of a known bearing assembly for the downstream end of the position indicating shaft.

FIG. 6 is a partial, exploded perspective view of the bearing assembly shown in FIGS. 4 and 5.

DETAILED DESCRIPTION OF THE PREFERRED EMBODIMENT

Figure 4:
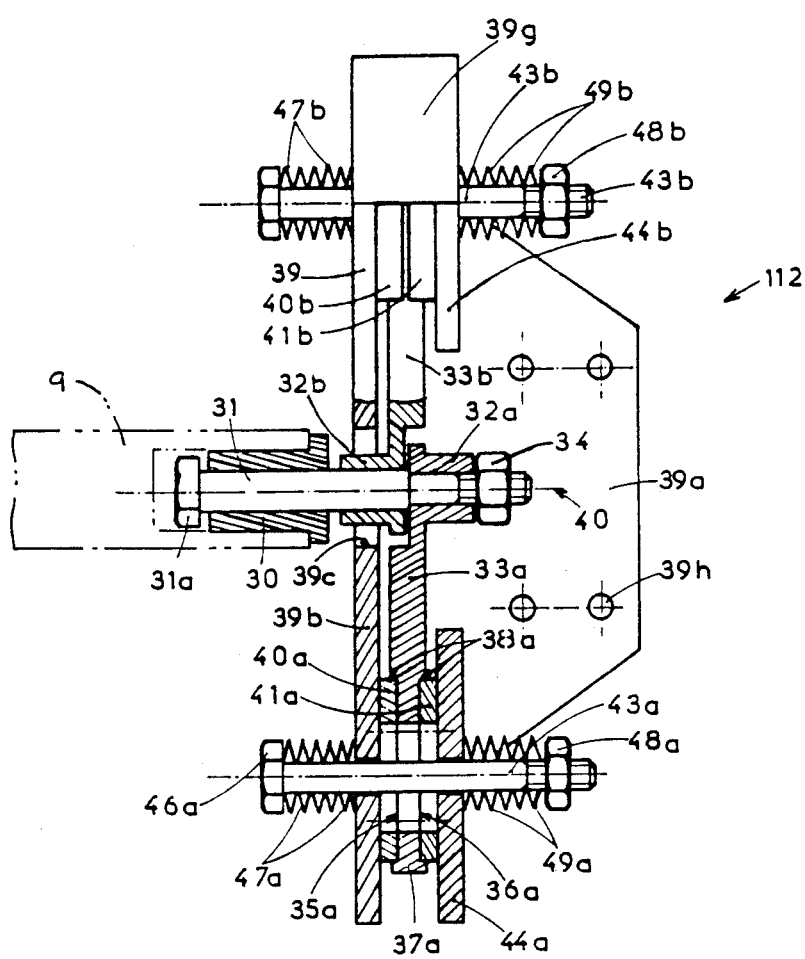
FIG. 4 is a top view, partially in section, of a bearing assembly for supporting the downstream end of the position indicating shaft according to the invention.

The downstream end of shaft 9 is supported by bushing 30 mounted on bolt 31 which passes through the bushing 30 and also through openings defined in first ends of support arms 33a and 33b, respectively. Cylindrical flanges 32a and 32b are formed on the first ends of the support arms and, as illustrated in FIG. 4, extend in opposite directions from each other. The elements are retained in position by the bolt head 31a and nut 34 threadingly engaged on the opposite end of the bolt 31.

Each support arm 33a and 33b has a second end which assumes a generally flat, planar shape having generally parallel sides 35a and 36a illustrated in FIG. 6. Although FIG. 6 shows only one support arm 33a for the purposes of clarity, it is to be understood that the construction of the second end of arm 33b is identical to arm 33a. Flange 37a is formed on the dital ends of the support arms and flange 38a is formed on the inner extremity of the flat portions 35a and 36a.

Mounting bracket 39 comprises attachment portion 39a and base portion 39b. Attaching portion 39a defines holes 39h to accommodate fastening means (not shown) to fixedly attach the bracket 39 to the fixed portion of the duct 5a. The precise means for attaching the bracket to the duct forms no part of the instant invention and any known means may be utilized.

Base portion 39b defines enlarged opening 39c as well as openings 39d and 39e. The central axes of these openings extend substantially parallel to the longitudinal axis of the shaft 9. Lines interconnecting the longitudinal center lines of the these openings in the plane of base portion 39 form an isosceles triangle. Holes 39d and 39e are symmetrically located with respect to enlarged opening 39c.

As shown in FIG. 4, bolt 31 and cylindrical flange 32b extend through enlarged opening 39c. The diameter of enlarged opening 39c exceeds that of cylindrical flange 32b and the inner surface of enlarged opening 39c serves to limit the movement of the cylindrical flange 32b in a plane extending transverse to the longitudinal axis of shaft 9.

Anti-friciton shims 40a and 41a are located on sides 35a and 36a of the support arms 33a and 33b. The anti-friction shims 40a and 40b may be formed of anti-friction material or may have a coating of such anti-friction material. The second end of arms 33a and 33b, as well as the anti-friction shims 40a and 41a define elongated slots 42c, 42a and 42b. The second ends of the support arms are attached to mounting bracket 39 via mounting plates 44a and 44b. As illustrated in FIG. 4, the second ends of support arms 33a and 33b are located between base portion 39b and mounting plates 44a and 44b. Anti-friction shims 40a and 41a are located on either side of the second ends of the support arms and are interposed between the ends and the base portion 39b as well as between the ends and the mounting plates 44a and 44b, respectively. Mounting plates 44a and 44b define an opening illustrated at 45a in FIG. 6.

A bolt 43a extends through openings 39d and 45a in the base portion and the mounting plates, respectively, and passes through slots 42a, and 42b and 42c. Belleville springs 47a are interposed between the base portion 39b and the head 46a of bolt 43a, while similar Belleville springs 49a are interposed between the mounting plate 44a and nut 48a attached to bolt 43a. The springs serve to bias the mounting plate 44a towards base portion 39b. A similar bolt 43b, Belleville springs 47b, 49b and nut 48b are utilized with the second support arm 33b and its associated mounting plate 44b as shown in FIG. 4.

Figure 5:
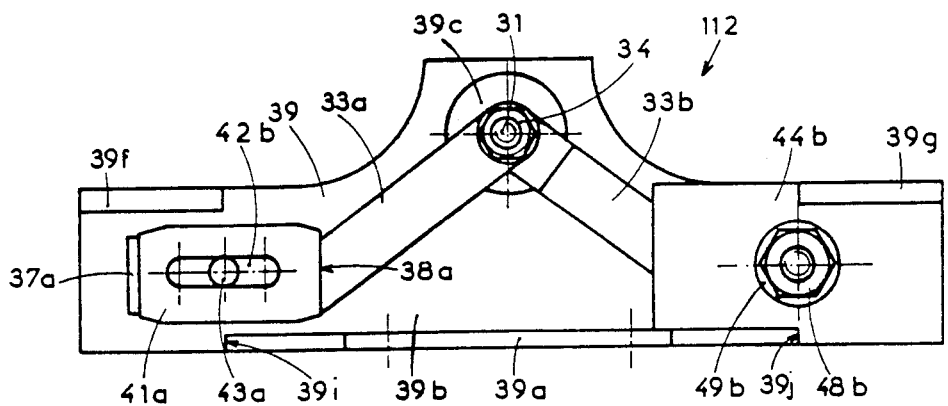
FIG. 5 is a rear view of the bearing assembly shown in FIG. 4.

The base portion of mounting bracket 39 has flanges 39f and 39g extending therefrom substantially parallel to attaching portion 39a. Attaching portion 39a defines edges 39i and 39j as shown in FIG. 6. Each of the mounting plates 44a and 44b have notches which engage flanges 39f and 39g and also define an edge flange which engages surfaces 39i and 39j as shown in FIG. 5. The engagement of these elements serves to limit the motion of mounting plates 44a and 44b to translational movement in a direction generally parallel to the longitudinal axis of shaft 9. The plates may not rotate about the axis of attaching bolts 43a and 43b, nor may they undergo any translational movement in a plane perpendicular to the longitudinal axis of shaft 9.

In the bearing assembly according to the invention, the support arms 33a and 33b are each free to pivot about their attaching bolts 43a and 43b. However, this pivoting motion is restricted by the contact between cylindrical flange 32b and the inner surface of enlarged opening 39c. The slots 42a, 42b and 42c allow additional clearances around the attaching bolts 43a and 43b.

In one practical application, the diameter of enlarged opening 39c is approximately 12 mm. The adjustment of nuts 48a and 48b on bolts 43a and 43b allows the clamping force between the mounting plates 44a and 44b, and the base portion 39b to be adjusted to allow adjustment of the damping of the transverse motions of the bushing 30 supporting the end of shaft 9. The invention allows the use of a relatively large number of Belleville springs to improve the adjustment precision and to compensate for the damping degradation due to any wear.

The foregoing description is provided for illustrative purposes only and should not be construed as in any way limiting this invention, the scope of which is defined solely by the appended claims.

What is claimed is:

1. A bearing assembly for supporting an end of a shaft of a position sensor system for a thrust reverser of a secondary duct of a turbofan jet engine wherein the thrust reverser has a stationary portion and a movable portion, the bearing assembly comprising:
   (a) a bushing adapted to engage and support an end of the shaft;
   (b) a pair of support arms, each support arm having first and second ends;
   (c) first connecting means pivotally connecting the bushing to the first ends of both support arms such that the arms may undergo pivotal motion about an axis extending generally parallel to a longitudinal axis of the shaft;
   (d) bracket means fixedly attached to the stationary portion of the thrust reverser; and,
   (e) second connecting means connecting each second end of the support arms to the bracket means such that each second end may undergo movement with respect to the bracket means in a place extending generally perpendicular to the longitudinal axis of the shaft.

2. The bearing assembly according to claim 1 wherein the first connecting means comprises first bolt means attached to the bushing and extending through the first ends of the support arms.

3. The bearing assembly according to claim 2 wherein each second end of the support arms defines an elongated slot and wherein the second connecting means comprises:
   (a) second bolt means extending through the bracket means and the elongated slot defined by the second end of one of the support arms; and,
   (b) third bolt means extending through the bracket means and the elongated slot defined by the second end of the other of the support arms.

4. The bearing assembly according to claim 3 further comprising:
   (a) a first generally cylindrical flange extending in a first direction from the first end of one of the support arms, the first flange defining an opening to accommodate the first bolt means; and,
   (b) a second generally cylindrical flange extending from the first end of the other of the support arms in a second direction opposite to the first direction, the second flange defining an opening to accommodate the first bolt means.

5. The bearing assembly according to claim 4 wherein the bracket means comprises:
   (a) an attaching plate adapted to be attached to the stationary portion of the thrust reverser; and,
   (b) a base plate extending from the attaching plate and defining a first enlarged opening to accommodate the passage therethrough of the first bolt means and the second cylindrical flange, and second and third openings to accommodate the passage therethrough of the second and third bolt means.

6. The bearing assembly according to claim 5 wherein the second connecting means further comprises:
   (a) a first mounting plate extending generally parallel to the base plate and defining an opening to allow passage of the second bolt means therethrough, the first mounting plate located such that the second end of one of the support arms is disposed between the base plate and the first mounting plate, and contacting the base plate and attaching plate such that it may only undergo translational movement in a direction generally parallel to the longitudinal axis of the shaft; and,
   (b) a second mounting plate extending generally parallel to the base plate and defining an opening to allow passage of the third bolt means therethough, the second mounting plate located such that the second end of the other of the support arms is disposed between the base plate and the second mounting plate, and contacting the base plate and attaching plate such that it may only undergo translational movement in a direction generally parallel to the longitudinal axis of the shaft.

7. The bearing assembly according to claim 6 further comprising anti-friction means interposed between the base plate and the second ends of the support arms, and the first and second mounting plates and the second ends of the support arms.

8. The bearing assembly according to claim 7 further comprising:
   (a) first spring means interposed between the second bolt means and the base plate; and,
   (b) second spring means interposed between the third bolt means and the base plate.

9. The bearing assembly according to claim 8 further comprising:
   (a) third spring means interposed between the first mounting plate and the second bolt means; and,
   (b) fourth spring means interposed between the second mounting plate and the third bolt means.

10. The bearing assembly according to claim 9 wherein the first, second, third and fourth spring means comprises Belleville springs.

11. The bearing assembly according to claim 10 wherein the second cylindrical flange is oriented so as to extend through the first elongated opening defined by the base plate.

12. The bearing assembly according to claim 11 wherein the lines connecting axes of the first enlarged opening, the second opening and the third opening defined by the base plate form a triangle.

13. The bearing assembly according to claim 12 wherein the triangle formed is an isosceles triangle.

* * * * *

UNITED STATES PATENT AND TRADEMARK OFFICE
CERTIFICATE OF CORRECTION

PATENT NO. : 4,761,949

DATED : August 9, 1988

INVENTOR(S) : Guy E. O. LECLERCQ

It is certified that error appears in the above-identified patent and that said Letters Patent is hereby corrected as shown below:

Col. 1, line 16, "additonal" should be --additional--.

Col. 1, line 23, "the" should be --The--.

Col. 3, line 51, "dital" should be --distal--.

Col. 3, line 65, delete "the".

Col. 4, line 8, "Anti-friciton" should be --Anti-friction--.

Col. 5, line 23, claim 1, "place" should be --plane--.

Signed and Sealed this

Twentieth Day of December, 1988

Attest:

DONALD J. QUIGG

*Attesting Officer*     *Commissioner of Patents and Trademarks*